United States Patent [19]
Carlqvist et al.

[11] Patent Number: 5,983,636
[45] Date of Patent: Nov. 16, 1999

[54] POWER CONVERTER ACCORDING TO THE PRINCIPLE OF THE HOT-AIR ENGINE

[75] Inventors: Stig G. Carlqvist, deceased, late of Malmö, by Siv Carlquist, legal representative; by Thomas G. Carlqvist, legal representative, Järfälla; by Barbro M. Carlqvist, legal representative, Stockholm, all of Sweden

[73] Assignee: Ecker Maschinenbau GmbH, Neunkirchen, Germany

[21] Appl. No.: 08/204,401

[22] PCT Filed: Jul. 9, 1992

[86] PCT No.: PCT/EP92/01556

§ 371 Date: Apr. 21, 1997

§ 102(e) Date: Apr. 21, 1997

[87] PCT Pub. No.: WO94/01670

PCT Pub. Date: Jan. 20, 1994

[51] Int. Cl.[6] ............... F01B 7/10; F02G 1/043
[52] U.S. Cl. .................................. 60/517; 60/519
[58] Field of Search ............... 60/517, 519, 526

[56] References Cited

U.S. PATENT DOCUMENTS

| | | | |
|---|---|---|---|
| 3,220,177 | 11/1965 | Kohler | 60/526 |
| 3,431,788 | 3/1969 | Pré | 60/517 |
| 3,667,348 | 6/1972 | Neelen | 60/517 |

FOREIGN PATENT DOCUMENTS

| | | |
|---|---|---|
| 1213644 | 12/1958 | France . |
| 467792 | 9/1992 | Sweden . |
| 987687 | 6/1961 | United Kingdom . |
| WO 9208043 | 5/1992 | WIPO . |

OTHER PUBLICATIONS

Meijer, R.J., *The Evolution of the Stirling Engine*, Proceedings of 25th Intersociety Energy Conversion Engineering Conference, IECE–90 Aug. 1990.

Sutdy of 4–Cylinder, Double–Acting and Hermetically Sealed Stirling Engine, Proceedings of the 25th Intersociety Energy Conversion Engineer–ing Conference, IECE–90, Aug. 12–17, 1990, Reno, Nevada.

*Primary Examiner*—Ira S. Lazarus
*Assistant Examiner*—L. Heyman
*Attorney, Agent, or Firm*—James C. Wray; Meera P. Narasimhan

[57] ABSTRACT

The publication relates to a power converter according to the principle of the hot-air engine (Stirling engine), comprising a cylinder containing a main piston (4) and a displacement piston (3), each of which can be moved forward and backward on the axis of the cylinder and each of which possesses a piston rod assembly (20, 25) which is connected via connecting rods (17, 21) with a link system (21-24 or 17-19 resp.) to two parallel cranks (9) which rotate synchronously in opposite directions so that the displacement piston is moved phase-shifted to the main piston. The link system (21-24) of the main piston (4) comprises a frame element (24) which is rigidly connected to the latter's piston rod assembly (25) and has at least four journals (22,23) which are arranged symmetrically to the cylinder axis in a common plane perpendicular to the cylinder axis and which are oriented parallel to the crank shafts (9) and to each of which is linked a connecting rod (21). The link system (17-19) and/or the piston rod assembly (20) of the displacement piston (3) is/are passed through the frame element (24), and the cranks are constructed as crank shafts (9), on each of which the connecting rods (17, 21) act on a right angle bend (16, 14, 15) positioned between two, each, crank shaft bearings (11, 12). The right angle bends (14, or 16 and 15 resp.) of the crank shafts (9) which are connected to the link system (21-24) of the main piston (4) or which are respectively connected to the link system of the displacement piston (3) are off-set at angles to each other.

5 Claims, 4 Drawing Sheets

POWER CONVERTER ACCORDING TO THE PRINCIPLE OF THE HOT-AIR ENGINE

BACKGROUND OF THE INVENTION

The invention relates to a power converter according to the principle of the hot-air engine (Stirling engine, Ericsson engine), comprising a cylinder containing a main piston and a displacement piston, each of which can be moved forward and backward on the axis of the cylinder and each of which possesses a piston rod assembly which is connected via connecting rods with a link system to two parallel cranks which rotate synchronously in opposite directions so that the displacement piston is moved phase-shifted to the main piston.

Such a known power converter of the Stirling type has a so-called rhombic crank mechanism.

The piston rod of the main piston is tubular, and to it is attached an upper yoke which is located between the cylinder and the plane in which both parallel cranks are located. Two connecting rods, each of which is connected to one of the cranks, engage with journals in the ends of the upper yoke, so that a back and forth movement of the main piston of the cylinder and thus also of the yoke brings about a synchronous rotation of the crank shafts in opposite directions.

The piston rod of the displacement piston extends through the tubular piston rod of the main piston, and to it is attached a bottom yoke which in relation to the cylinder is located behind the plane of the cranks. At the ends of the bottom yoke, connecting rods are attached rotatably and act with their respective crank on the same crank journal as the corresponding connecting rod of the upper yoke. The bottom yoke, and thus the displacement piston, also move back and forth during the synchronous rotation of the cranks in the opposite direction, but their movement is phase-shifted in relation to the upper yoke. The phase shifting is brought about in that the connecting rods are directed from the yokes outward at an angle, and from the different yokes towards each other.

This mechanism, also called a rhombus mechanism, uses slide bearings which are lubricated with oil.

For this purpose, a special circulation lubrication system is used, comprising an oil pump and oil ducts to the various lubrication points, thus making the power converter more complicated and more expensive.

Another disadvantage is that the oil lubrication requires that the crank case of the power converter with the rhombic crank mechanism must be sealed off hermetically against the cylinder of the power converter, so that the working gases in the cylinder do not mix with oil, which could result in a harmful contamination of the heat exchanger in the power converter. Due to the necessary high pressure of the working gas, this sealing is hard to realize and requires the use of expensive and complicated seals.

Because of these disadvantages, permanently lubricated roller bearings which do not require a special circulation lubrication system are used instead of the oil-lubricated slide bearings, if possible. This applies in particular to the construction of small, one-cylinder power converters, where the cost aspect plays an important role and the lower friction of the roller bearings results in conspicuous positive effects.

With larger power converters, it is common that for the use of permanently lubricated roller bearings multi-cylinder constructions are chosen, in which the forces are distributed over a larger number of bearings which are then subject to a smaller load and thus have a significantly longer life span. But the disadvantage of such multi-cylinder constructions is again that they are significantly more expensive and complicated than one-cylinder constructions.

SUMMARY OF THE INVENTION

The invention is based on the task of creating an efficient one-cylinder power converter whose bearings have a long life span without any external lubrication.

In a power converter of the initially mentioned type, this objective is achieved in that the link system of the main piston comprises a frame element with at least four journals which are arranged symmetrically to the cylinder axis in a common plane perpendicular to the cylinder axis and which are oriented parallel to the crank shafts, and to each of which is linked a connecting rod, that the link system and/or the piston rod assembly of the displacement piston is/are passed through the frame element, and that the cranks are constructed as crank shafts, on each of which the connecting rods act on a right angle bend positioned between two, each, crank shaft bearings.

In this way, the number of bearings is increased in order to reduce the specific load on the bearings and increase the life span so that permanently lubricated bearings, preferably roller bearings, are sufficient even for large one-cylinder power converters. The link system of the displacement piston does not require an increase in the number of bearings; the force is obtained for the most part, e.g. 98%, at the main piston.

This makes it possible that the mechanism can be encapsulated together with generators driven by the crank shafts in a pressure-tight case, and that the case can be filled with the same pressurized gas which the power converter uses, usually helium or hydrogen. This prevents a leakage loss at the transition point of the piston rod of the displacement piston through the main piston and thus also increases the life span of the power converter in this regard.

The absence of a central lubrication also makes it possible to operate the engine in any position. This is particularly important for the type of heating, e.g. whether liquid or solid fuel or solar energy via a parabola mirror is used, if the power converter must follow the movement of the latter.

The proposed solution can be applied to a rhombic mechanism. In this case, all right angle bends of the crank shafts are positioned identically.

But it is preferred that instead of the angled arrangement of the connecting rods, the right angle bends of the crank shafts connected to the link system of the main piston and those connected to the link system of the displacement piston are off-set at angles corresponding to the different movements which both pistons are supposed to execute. Also conceivable is a combination of both principles, even partially.

The right angle bends which were off-set at angles also have the advantage in connection with the frame element that both link systems are able to act from the same side on the crank shafts. The link system of the displacement piston, preferably a yoke with two connecting rods, has space and movement space in the frame element of the main piston. Because of this, the entire mechanism can be more compact—an important advantage for the portable use of the power converter.

It is useful that the piston rod assembly of the main piston consists of two piston rods attached symmetrically to the cylinder axis at the main piston.

The drawings reflect an embodiment of the invention.

DETAILED DESCRIPTION OF THE DRAWINGS

Figure 1:
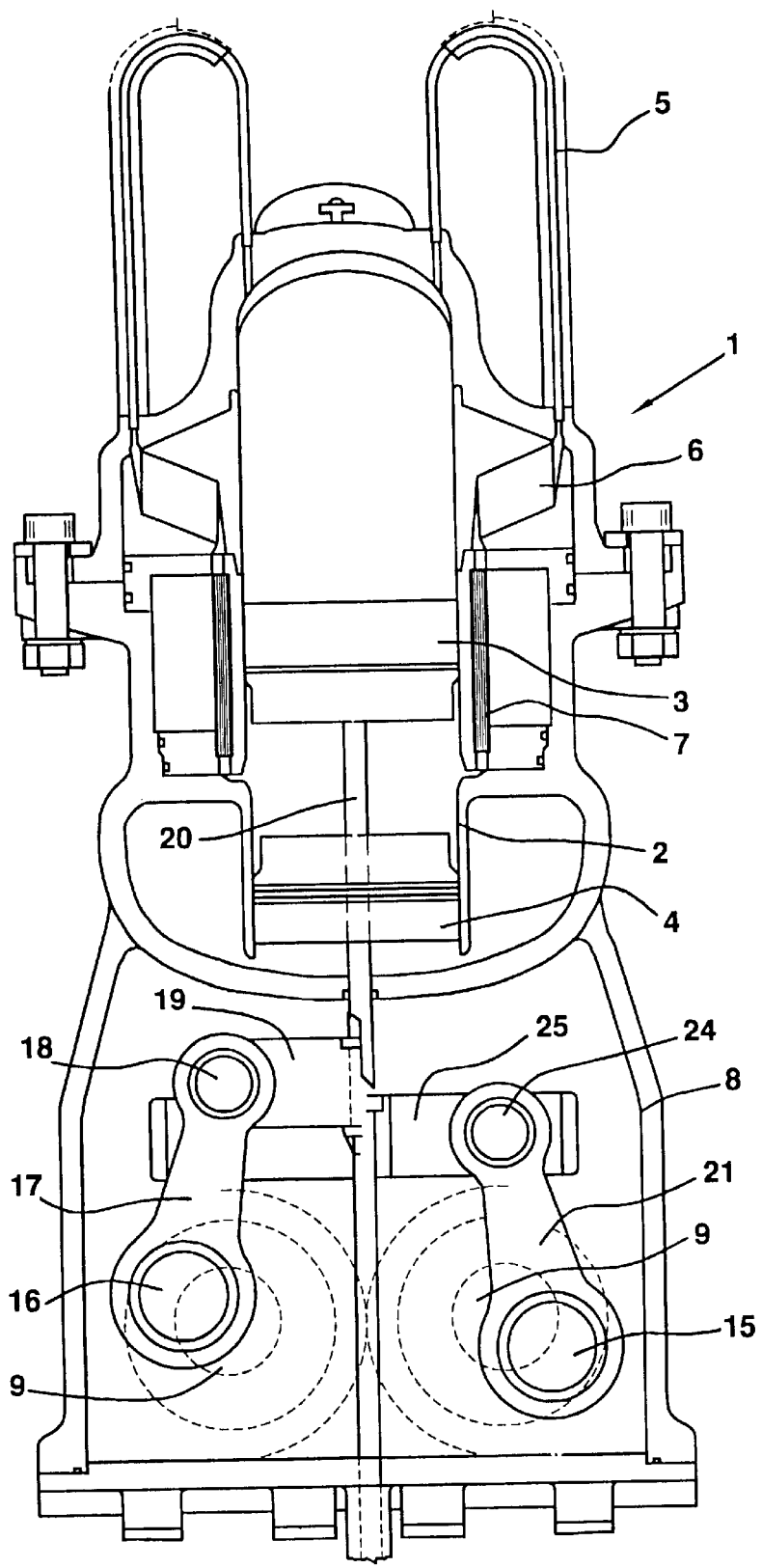
FIG. 1 shows an axial section of a Stirling engine.
Figure 2:
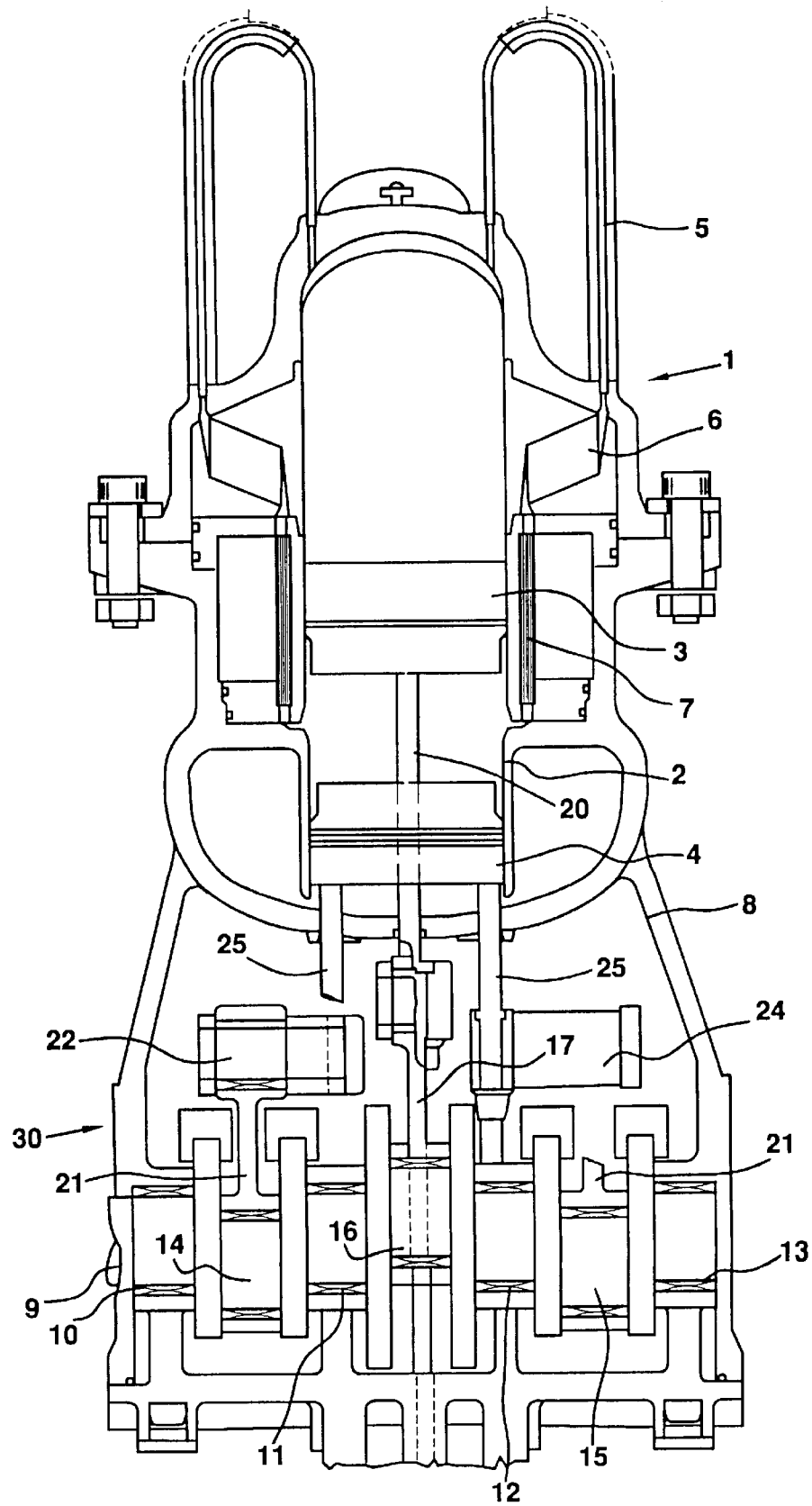
FIG. 2 shows the Stirling engine in an axial section which is vertical to FIG. 1.
Figure 3:
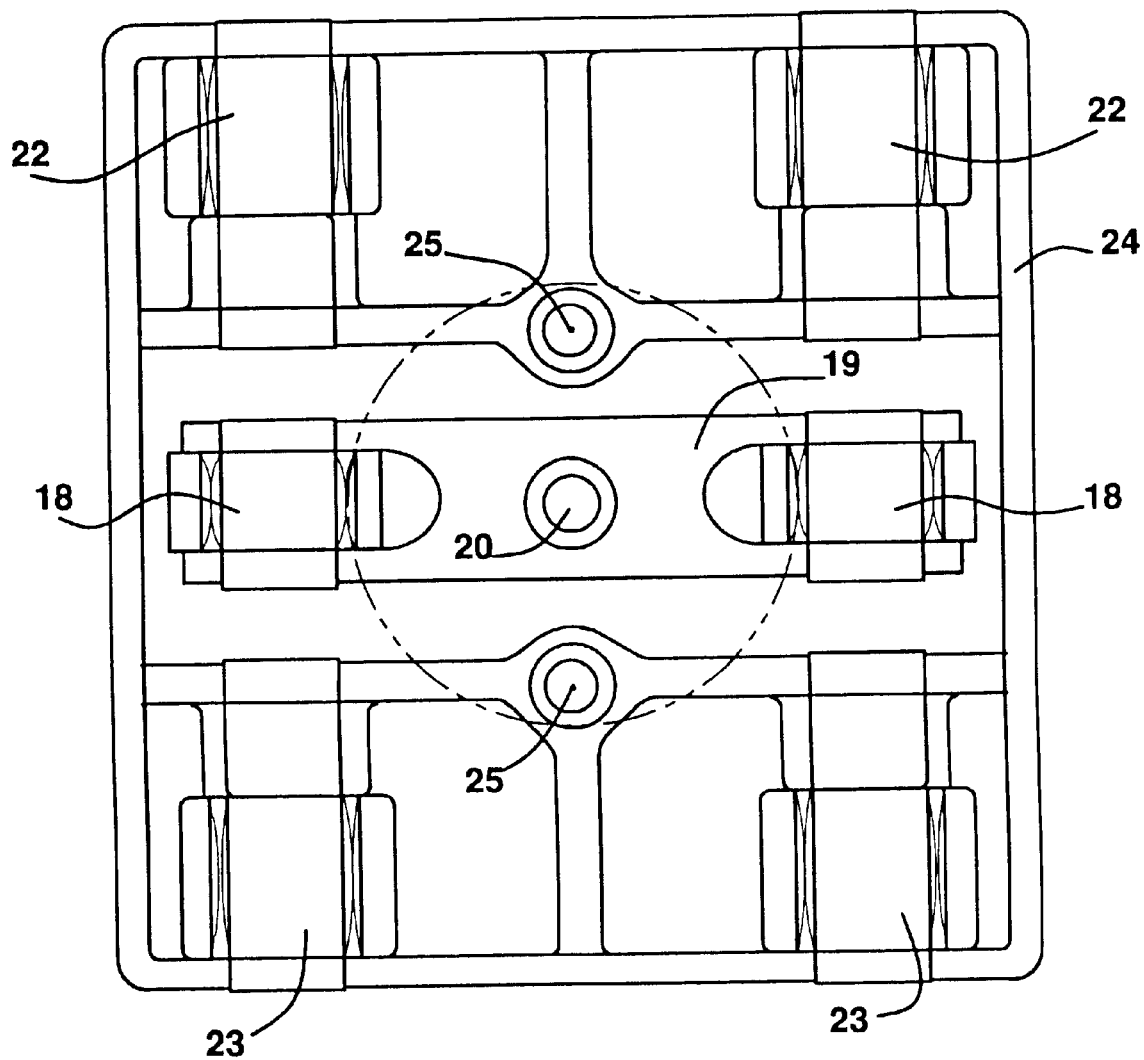
FIG. 3 shows the Stirling engine in a section along line III—III in FIGS. 1 and 2.
Figure 4:
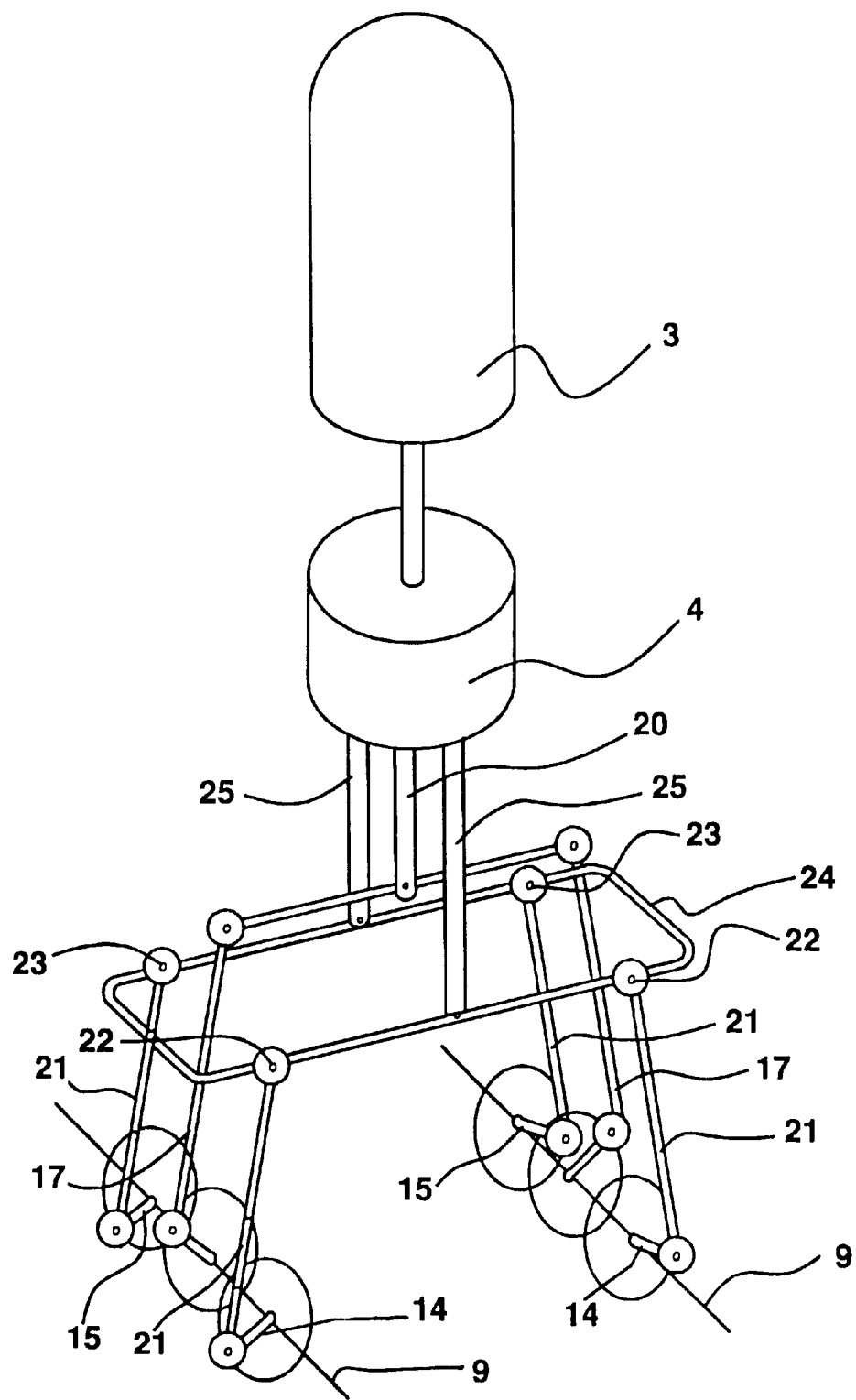
FIG. 4 shows a schematic view of the Stirling engine.

The Stirling engine 1 has a cylinder 2 in which a displacement piston 3 and a main piston 4 are arranged. The top part in FIGS. 1 and 2 shows heating pipes 5 which are located in a combustion chamber (not shown) and which connect the cylinder chamber above the displacement piston 3 to the outside of an annular regenerator 6 which surrounds the cylinder 2. The inside of the regenerator 6 is connected to a chamber in which is arranged a cooler 7, said cooler again being connected to the cylinder chamber below the displacement piston 3.

For more details regarding the construction and function of the Stirling engine we refer to Werdich, Martin: "Stirling-Maschinen: Grundlagen, Technik, Anwendung", Ökobuch 1991, ISBN 3-922964-35-4, and to Kenzel, Manfred: "Stirlingmotor der Zukunft", VDI-Verlag 1986, in both of which the rhombic mechanism is also shown and described.

In the crank case 8 of the Stirling engine, two parallel crank shafts 9 are arranged symmetrically to the axis of the cylinder 2 and perpendicular to it.

Each of the crank shafts has three right angle bends 14, 15, 16 between four bearings 10, 11, 12, 13. The right angle bends 14 and 15 are both arranged in one plane, while the third right angle bend 16 is oriented so that it is off-set at an angle to them. The right angle bend arrangement of the crank shafts is mirror-symmetrical to a plane through which the cylinder axis extends.

The middle right angle bend 16 is always connected rotatably to a connecting rod eye of a connecting rod 17 whose other connecting rod eye engages rotatably with a journal 18 arranged at the yoke 19.

The yoke 19 is mirror-symmetrical to the plane of the cylinder axis, and the journals 18 at its ends are oriented parallel to the crank shafts 9. A piston rod 20 which extends coaxially and in a sealed manner through the main piston 4 and which is attached to the underside of the displacement piston 3 is connected in a rigid manner to the middle of the yoke.

The remaining right angle bends 14 and 15 of the crank shaft 9 are connected rotatably to one connecting rod eye of a connecting rod 21, whose other connecting rod eye engages rotatably with a journal 22, 23 positioned on a frame element 24. The frame element 24 is positioned mirror-symmetrical to the plane of the cylinder axis, and the journals 22 and 23 are arranged in pairs and parallel to the crank shafts 9. The spacing between the journal pairs 22, 23 associated with the different crank shafts 9 is—like the spacing of journals 16 from each other—identical to the spacing of the crank shafts 9 from each other in their bearings 10–13.

The frame element 24 is constructed as a very stiff framework with a central aperture which is sufficiently large to permit the unobstructed passage of the yoke 19 in the direction of the cylinder axis. At opposite sides of the central aperture are attached two piston rods 25 which are located in one plane with the cylinder axis and which are arranged parallel to each other at the same distance from this axis. The piston rods 25 extend—like piston rods 20—in a sealed manner through a wall which allows for different gas pressures in the cylinder chamber of the engine and in the crank shaft chamber and are connected to the underside of the main piston.

All bearings 10, 11, 12, 13, as well as the bearings of the connecting rods, are encapsulated, permanently lubricated roller bearings which are completely maintenance-free and which—due to their large number of bearings—are only subject to small bearing loads, thus resulting in a longer life span.

At point 30, a hood could be attached in a pressure-tight manner to the crank case 8, wherein the crank shafts 9, for instance, each drive one generator. All movable parts are thus encapsulated.

The shown Stirling engine is primarily intended for stationary use and may be used e.g. for driving a generator which is coupled to its crank shafts.

Also possible would be a structural unit with an integrated multiple arrangement of the Stirling engine, possibly in tandem arrangement with rigidly connected frame elements.

It is claimed:

1. Power converter according to the principle of the hot-air engine comprising a cylinder (2) containing a main piston (4) and a displacement piston (3), each of which can be moved forward and backward on the axis of the cylinder (7) and each of which possesses a piston rod assembly (20, 25) which is connected via connecting rods (17, 21) with a link system (21-24 or 17-19 resp.) to two parallel cranks (9) which rotate synchronously in opposite directions so that the displacement piston is moved phase-shifted to the main piston, characterized in that the link system (21-24) of the main piston (4) comprises a frame element (24) which is rigidly connected to a main piston rod assembly (25) and has at least four journals (22,23) which are arranged symmetrically to the cylinder axis in a common plane perpendicular to the cylinder axis and which are oriented parallel to the crank shafts (9) and to each of which is linked a connecting rod (21), that the link system (17-19) and/the piston rod assembly (20) of the displacement piston (3) are passed through the frame element (24), and that the cranks are constructed as crank shafts (9), on each of which the connecting rods (17, 21) act on a right angle bend (16, 14, 15) positioned between two, each, crank shaft bearings (11, 12).

2. Power converter as claimed in claim 1, characterized in that the right angle bends (14, 16 and 15 resp.) of the crank shafts (9) which are connected to the link system (21-24) of the main piston (4) which are respectively connected to the link system of the displacement piston (3) are off-set at angles to each other.

3. Power converter as claimed in claim 1, characterized in that the piston rod assembly (25) of the main piston (4) has two piston rods which are attached symmetrically to the cylinder axis on the main piston (4).

4. Power converter as claimed in claim 1, characterized in that the link systems and crank shafts are arranged together with a generator which is connected to both crank shafts, each, generator which is connected to the crank shafts, inside a tight device case filled with the gas that the power converter uses for operation.

5. Power converter as claimed in claim 1, characterized in that all mentioned bearings (10-13, 14-16, 18, 22, 23) are permanently lubricated roller bearings.

* * * * *